US007404065B2

(12) United States Patent
Jourdan et al.

(10) Patent No.: US 7,404,065 B2
(45) Date of Patent: Jul. 22, 2008

(54) FLOW OPTIMIZATION AND PREDICTION FOR VSSE MEMORY OPERATIONS

(75) Inventors: Stephan Jourdan, Portland, OR (US); Per Hammarlund, Hillsboro, OR (US); Michael Fetterman, Hillsboro, OR (US); Michael P. Cornaby, Hillsboro, OR (US); Glenn Hinton, Portland, OR (US); Avinash Sodani, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 389 days.

(21) Appl. No.: 11/315,964

(22) Filed: Dec. 21, 2005

(65) Prior Publication Data

US 2007/0143575 A1    Jun. 21, 2007

(51) Int. Cl.
*G06F 15/00* (2006.01)
*G06F 15/76* (2006.01)
*G06F 9/45* (2006.01)

(52) U.S. Cl. .................. 712/2; 712/7; 712/6; 712/5; 712/4; 717/139; 717/140

(58) Field of Classification Search ............. 712/2, 712/7, 6, 5, 4; 717/139, 140
See application file for complete search history.

(56) References Cited

U.S. PATENT DOCUMENTS

| | | | | |
|---|---|---|---|---|
| 4,734,877 A | * | 3/1988 | Sakata et al. ............ 708/441 |
| 4,791,555 A | * | 12/1988 | Garcia et al. ............ 712/1 |
| 4,881,168 A | * | 11/1989 | Inagami et al. ........... 712/5 |
| 5,511,210 A | * | 4/1996 | Nishikawa et al. ........ 712/5 |
| 5,664,134 A | * | 9/1997 | Gallup et al. ............ 712/245 |
| 5,881,302 A | * | 3/1999 | Omata ................... 712/2 |
| 6,006,315 A | * | 12/1999 | Park .................... 712/7 |
| 6,170,001 B1 | * | 1/2001 | Hinds et al. ............. 708/495 |
| 6,195,747 B1 | * | 2/2001 | Hou .................... 712/222 |
| 6,263,417 B1 | * | 7/2001 | Koyanagi ............... 712/34 |
| 2002/0040428 A1 | * | 4/2002 | Washio ................. 712/225 |

OTHER PUBLICATIONS

Author: Michael Wolfe, Title: "Vector optimization vs vectorization", Date: 1988, Publisher: Academic Press, Pertinent pp. 309-315.*

* cited by examiner

*Primary Examiner*—Eddie P Chan
*Assistant Examiner*—Idriss Alrobaye
(74) *Attorney, Agent, or Firm*—Blakely, Sokoloff, Taylor & Zafman LLP

(57) ABSTRACT

In one embodiment, a method for flow optimization and prediction for vector streaming single instruction, multiple data (SIMD) extension (VSSE) memory operations is disclosed. The method comprises generating an optimized micro-operation (μop) flow for an instruction to operate on a vector if the instruction is predicted to be unmasked and unit-stride, the instruction to access elements in memory, and accessing via the optimized μop flow two or more of the elements at the same time without determining masks of the two or more elements. Other embodiments are also described.

23 Claims, 8 Drawing Sheets

FLOW OPTIMIZATION AND PREDICTION FOR VSSE MEMORY OPERATIONS

FIELD OF THE INVENTION

The embodiments of the invention relate generally to the field of central processing units (CPUs) and, more specifically, relate to flow optimization and prediction for vector streaming single instruction, multiple data extension (VSSE) memory operations.

BACKGROUND

In specialized markets, a vector processor operating with a vector instructions set provides high-performance results. When vector instruction sets are implemented in a computer system, software may be written to take advantage of these vector instruction sets. For compatibility and standardization reasons, users expect this software to operate on all products distributed by the creator of the vector instruction set. Implementing the vector instruction set on existing architecture platforms is needed to ensure compatibility and standardization. In some cases, the vector instruction set may have to be implemented on an essentially scalar processor.

Typically, vectors are formed of many elements. Memory operations for these vectors are similarly divided into multiple elements. In addition, a 'vector stride' (VS) of the memory operation (how much each element in the operation is spaced from each other) is tracked. The base address specifies the location of the first element, while the second element is at the base address+VS, the third element is at the base address+2*VS, and so on.

In some cases, performing a general memory operation on a long vector can be time consuming (i.e., many clock cycles). This is because the elements being accessed are sequenced out according to their VS in a long and cumbersome general purpose flow. Each element must be individually accessed in a load or store operation, while the bits in-between the elements are left untouched by the load or store operation. In the case of operating on a 512b vector, for example, performing a general memory operation on that vector can be quite inefficient.

A condition that may contribute to efficient memory operations is when the VS of the memory operation indicates "unit-stride" elements. This means that the VS matches the element size of the vector being operated on so that all elements in the vector are continuous and consecutive in memory (the source or destination vector register matches the layout in memory). In addition, when VS=0, all memory instructions are unit-stride length. When operating with a 512b VL, it can be inefficient to individually access elements which are unit-strided.

Another condition contributing to efficient memory operations is the 'vector mask' (VM) of the instruction. The VM of an element indicates whether a memory operation should be applied to that element. For example, if the VM for an element is the Boolean value of true, then the memory operation should be applied to that element. Otherwise, the element retains its old value. If the VM for all elements in the vector is true, then all of the elements are operated on. This is known as "unmasked" code. Generally, most performance-critical code is unmasked. When operating with a 512b VL, it can be inefficient to assess the VM for each element in the vector.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

A method and apparatus for flow optimization and prediction for vector streaming single instruction, multiple data (SIMD) extension (VSSE) memory operations are described. In the following detailed description of the present invention, numerous specific details are set forth in order to provide a thorough understanding of the present invention. However, it will be apparent to one skilled in the art that the present invention may be practiced without these specific details. In other instances, well-known structures and devices are shown in block diagram form, rather than in detail, in order to avoid obscuring the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1B:
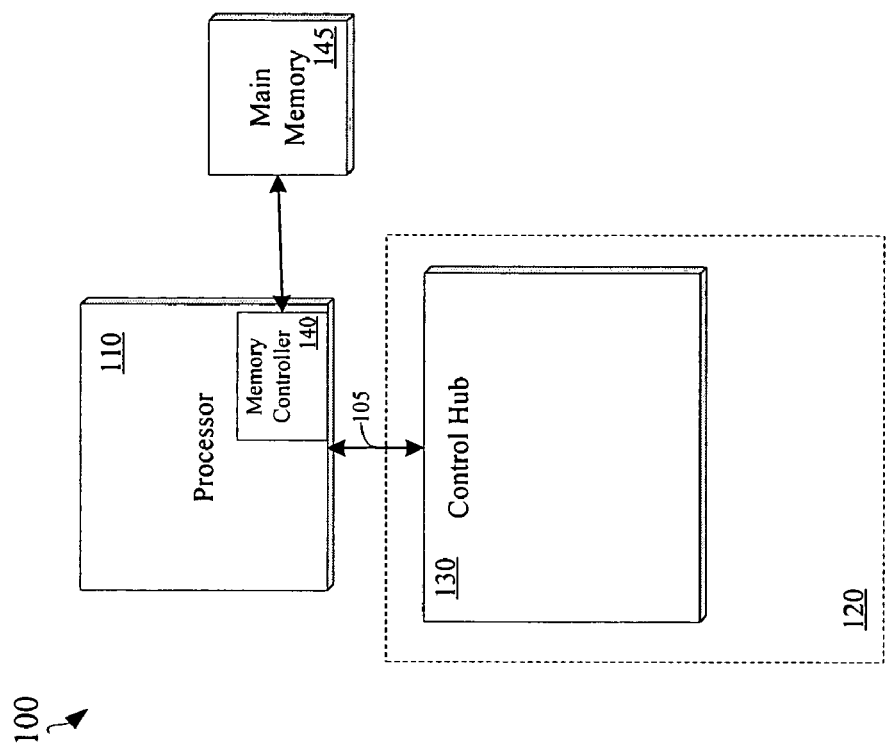
FIG. 1B illustrates a block diagram of another embodiment of a computer system.
Figure 1A:
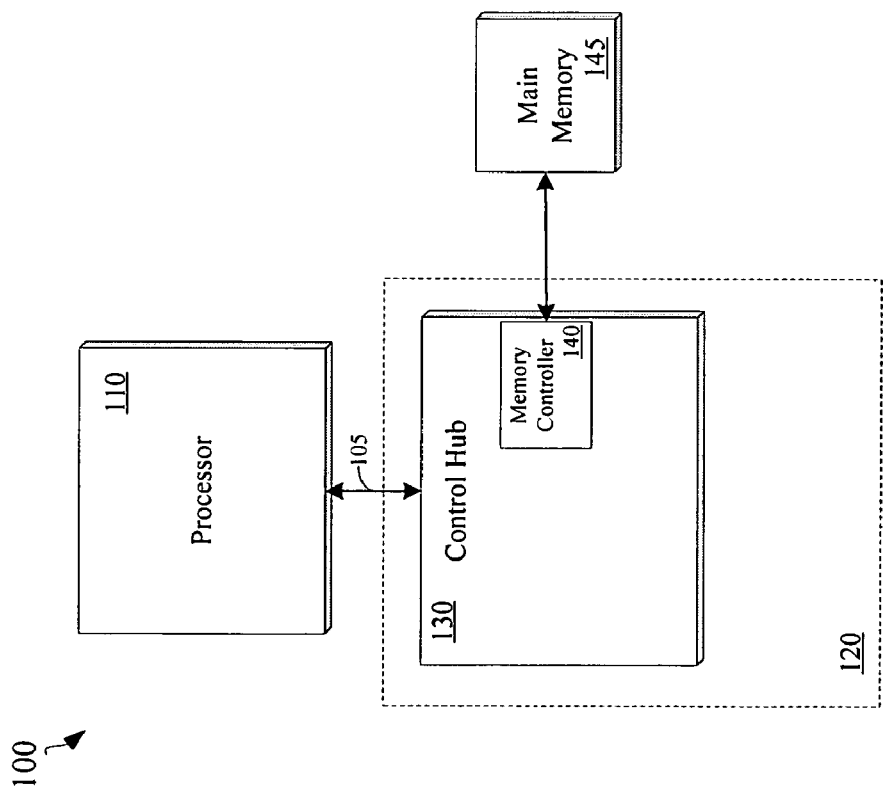
FIG. 1A illustrates a block diagram of one embodiment of a computer system.

FIGS. 1A and 1B illustrate a block diagram of one embodiment of a computer system 100. Computer system 100 includes a processor 110 coupled to an interconnect 105. In some embodiments, the terms processor and central processing unit (CPU) may be used interchangeably. In one embodiment, processor 110 is a processor in the Pentium® family of processors including the Pentium®D IV processors available from Intel Corporation of Santa Clara, Calif. Alternatively, other processors may be used. In a further embodiment, processor 110 may include multiple processor cores.

According to one embodiment, interconnect 105 communicates with a control hub 130 component of a chipset 120. In some embodiments, interconnect 105 may be point-to-point or, in other embodiments may be connected to more than two chips. Control hub 130 includes a memory controller 140 that is coupled to a main system memory 145, as depicted in FIG. 1A. In other embodiments, memory controller 140 may be in the same chip as processor 110, as depicted in FIG. 1B.

In some embodiments, the memory controller 140 may work for all cores or processors in the chip. In other embodiments, the memory controller 140 may include different portions that may work separately for different cores or processors in the chip.

Main system memory 145 stores data and sequences of instructions and code represented by data signals that may be executed by processor 110 or any other device included in computer system 100. In one embodiment, main system memory 145 includes dynamic random access memory (DRAM); however, main system memory 145 may be implemented using other memory types. According to one embodiment, control hub 130 also provides an interface to input/output (I/O) devices within computer system 100.

Figure 2:
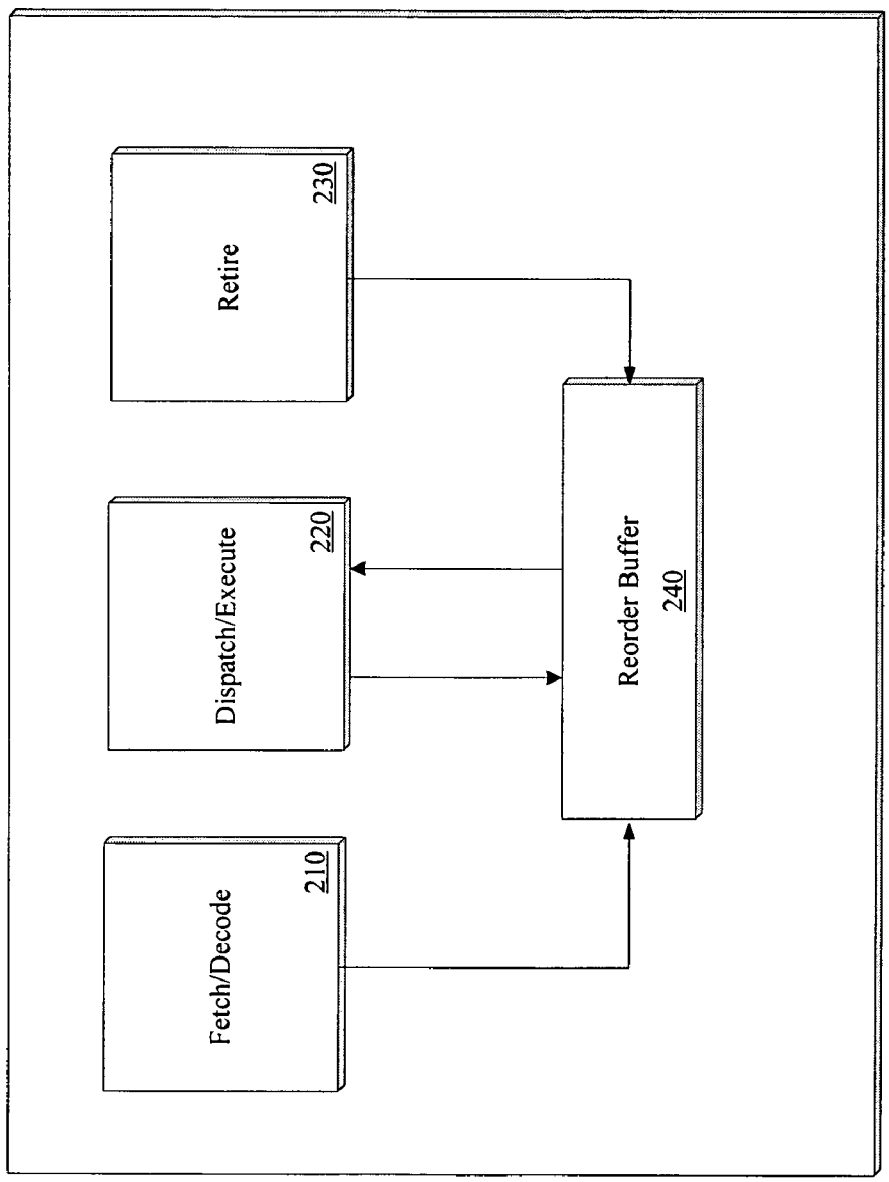
FIG. 2 illustrates a block diagram of one embodiment of a CPU.

FIG. 2 illustrates a block diagram of one embodiment of processor 110. Processor 110 includes fetch/decode unit 210, dispatch/execute unit 220, retire unit 230, and reorder buffer (ROB) 240. Fetch/decode unit 210 is an in-order unit that takes a user program instruction stream as input from an instruction cache (not shown) and decodes the stream into a series of micro-operations (µops) that represent the dataflow of that stream.

Dispatch/execute unit 220 is an out-of-order unit that accepts a dataflow stream, schedules execution of the µops subject to data dependencies and resource availability and temporarily stores the results of speculative executions. Retire unit 230 is an in-order unit that commits (retires) the temporary, speculative results to permanent states.

Embodiments of the present invention describe a method and respective circuit for flow optimization and prediction for VSSE memory operations in a processor, such as processor 110 described with respect to FIGS. 1 and 2. More specifically, embodiments of the invention provide a novel optimized µop flow for unmasked, unit-stride memory operations.

Figure 3:
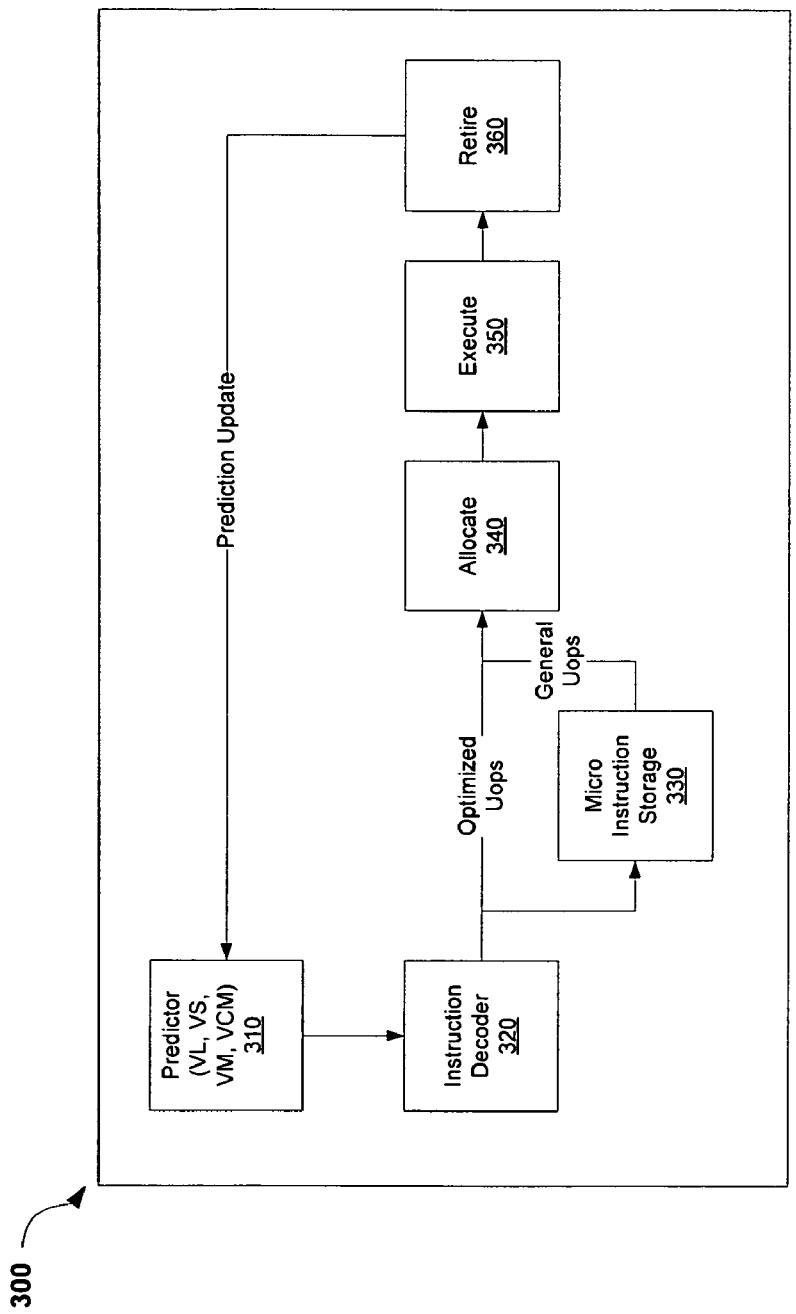
FIG. 3 illustrates a block diagram of another embodiments of a CPU.

FIG. 3 illustrates a block diagram for one embodiment of a processor 300 to implement µop flow optimization and prediction for unmasked, unit-stride VSSE memory operations. In some embodiments, processor 300 is the same as processor 110 as described with respect to FIGS. 1 and 2.

Predictor 310 tracks the value of vector length (VL), vector stride (VS), vector mask (VM), and vector completion mask (VCM) registers (not shown) in processor 300. VL specifies the length of the vector. VS specifies the spacing between each element in a vector. VM specifies the mask of the vector, or in other words, whether to operate on particular elements of the vector. VCM specifies which elements in the vector have been successfully completed if the vector faults. One skilled in the art should appreciate that these terms (i.e., VL, VS, VM, and VCM) are not meant to be limiting, and that other terms may be used to describe the above concepts.

Based on the tracked values of VL, VS, VM, and VCM, predictor 310 then generates a true or a false prediction. This true or false prediction is used to determine whether an optimized or non-optimized µop flow should be generated. It should be appreciated that a combination of the VL, VS, VM, and VCM values determine whether the optimized or non-optimized flow should be used, as will be discussed below. Predictor 310 contains logic to make this determination.

Furthermore, predictor 310 may be implemented in a variety of different ways. For example, a conservative predictor may be implemented that makes its predictions based on certainties. Such a predictor may eliminate the need for repairs and exception handling due to mispredictions. One skilled in the art will appreciate that there are a variety of possible predictor implementations.

As part of its prediction scheme, predictor 310 may track an instruction pointer (IP) of the instruction, the path of IPs leading to the instructions, and the instructions that actually modify the value of the VL, VS, VM, and VCM registers. Predictor 310 may then utilize these tracked values in order to make its true of false prediction for the µop flow.

As the actual values of VL, VS, VM, and VCM for an instruction may not be known until execution of the instruction, predictor 310 generates its own predictions of these values for the instruction and outputs a true or false prediction based on these predicted values. In other embodiments, predictor 310 may formulate its true or false prediction based on the actual values of VL, VM, VS, or VCM, if these actual values happen to be set before execution of the instruction.

In one embodiment, the predictor 310 generates a true prediction when the values (predicted or actual) of VL, VS, VM, and VCM indicate that an instruction is an unmasked and unit-stride memory operation. When the prediction is true, decoder 320 directly generates an optimized µop flow for the instruction. This optimized µop flow is sent from decoder 320 to allocate block 340 for scheduling. Then, the optimized µops are executed at execute block 350.

The predictor 310 generates a false prediction when the values (predicted or actual) of VL, VS, VM, and VCM indicate that an instruction is a masked or non-unit-stride memory operation. When the prediction is false, decoder 320 generates an "index" into micro instruction storage 330, and then a general purpose µop flow is read from the micro-instruction storage 330. The general purpose µop flow is executed based on the actual values of the VL, VS, VM, and VCM registers at execution, instead of the predicted values from predictor 310.

During execution at execute block 350, the actual values of VL, VS, VM, and VCM are captured. At retire block 360, these actual values are utilized to ensure that the prediction of VL, VS, VM, and VCM by predictor 310 was correct. This check is performed in the case of a true prediction by predictor 310. In the case of a false prediction, correct execution (although slower) has taken place because the general purpose µop flow is executed and this general flow utilizes the actual values of VL, VS, VM, and VCM at execution.

If the prediction by predictor 310 is correct at execute block 350, the instruction is allowed to retire at retire block 360 with the optimized µops that were produced. If the prediction was incorrect, the instruction is restarted from decoder 310, with an explicit statement that the general purpose µop flow is to be used. In either case, the results of the prediction accuracy check at execute block 350 are communicated back to the predictor 310 to support future accurate predictions by predictor 310.

Figure 4:
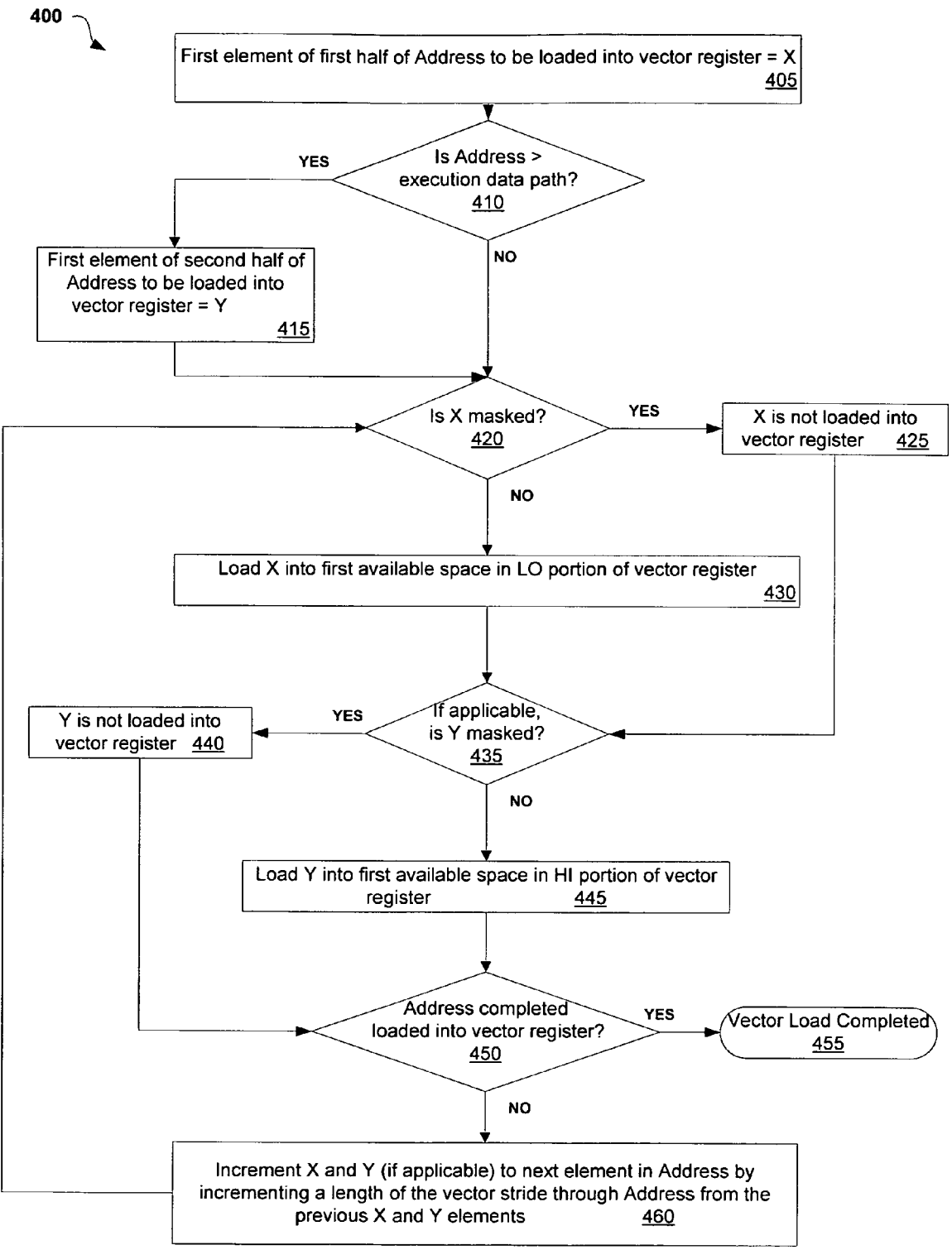
FIG. 4 is a flow diagram of one embodiment of a general purpose flow for a memory load operation.
Figure 5:
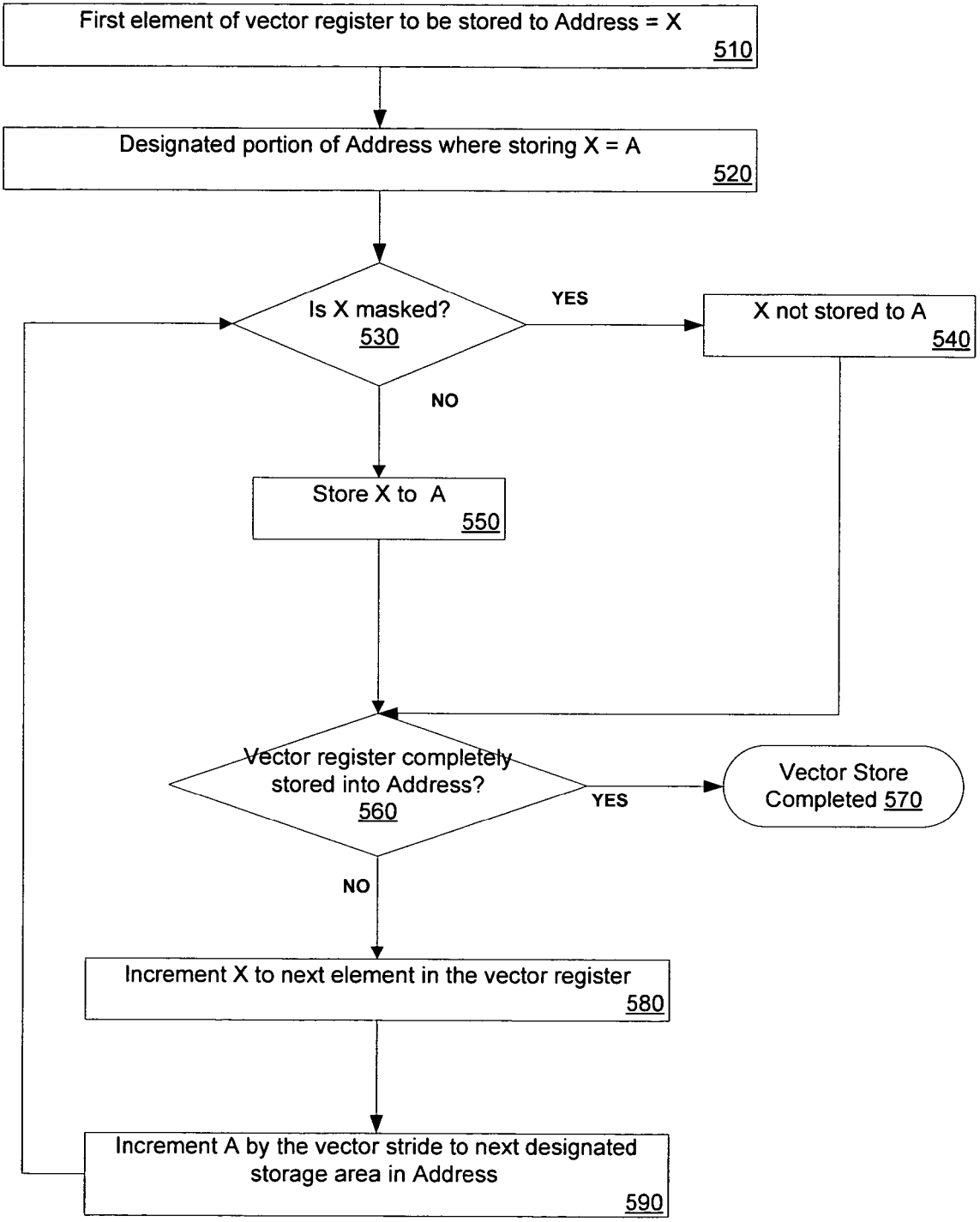
FIG. 5 is a flow diagram of one embodiment of a general purpose flow for a memory store operation.

FIGS. 4 and 5 are flow diagrams depicting embodiments of the processes for the general purpose µop flow that cover all general memory operation cases (i.e., masked, non-unit-stride, or unknown unit stride). The process 400 in FIG. 4 illustrates one embodiment of the general purpose µop flow for a load instruction in a processor. The process 500 in FIG. 5 illustrates one embodiment of the general purpose µop flow for a store instruction in a processor. One skilled in the art will appreciate that processors with differing vector lengths may implement the flows of FIGS. 4 and 5. In one embodiment, processes 400 and 500 may be performed by processor 300 illustrated with respect to FIG. 3.

Process 400 in FIG. 4 begins at processing block 405, where the first element of the first half of an address to be loaded into a vector register (Address) is set as X. At decision block 410, it is determined whether the size of Address is greater than the execution data path of the processor. If so, then the first element of the second half of Address is set as Y at processing block 415. This allows for unlamination in the processor for VLs longer than the execution data path.

In some cases, an execution path in a processor is smaller than the actual length (VL) of a vector to be operated on. Unlamination refers to the process of replicating a single instruction for this vector with long VL into many smaller instructions that operate on different portions of the vector. The single instruction that would apply to the whole vector is divided into as many instructions as desired to operate on the vector in the processor. For example, in a processor with a 256 bit execution path and a 512 bit vector length, the vector instruction would be unlaminated into two 256 bit identical instructions to operate on the vector. The vector is then also split into two 256 bit parts.

Returning to process 400, at decision block 420, it is determined whether X is masked. If so, then X is not loaded into the vector register at processing block 425. However, if X is not masked, then at processing block 430 X is loaded into the first available space in the LO portion of the vector register. The LO portion refers to the first half of the vector register. At decision blocks 435 through 445, the process of checking for masking and loading the element is repeated for Y. In this case Y is loaded into the HI portion of the vector register, which refers to the second half of the vector register.

At decision block 450, it is determined whether Address has been completely loaded into the vector register. If not, then at processing block 460, X and Y (if applicable) are incremented to the next element in Address by incrementing from the previous element a length of the vector stride to the next element. Then, the process of blocks 420 through 450 is repeated for each element of Address to be loaded. If, at decision block 450, each element of Address has been loaded, then the general purpose µop flow for the load instruction is completed at termination block 455.

FIG. 5 illustrates a similar process to that described with respect to FIG. 4, except for process 500 involves a store operation instead of a load operation. The process 500 begins at processing block 510 where a first element of a vector register that is to be stored to an address (i.e., Address) is set as X. Then, at processing block 520, the designated portion of Address where X is being stored is set as A.

At decision block 530, it is determined whether X is masked. If so, then X is not stored to A at processing block 540. However, if X is not masked, then at processing block 550 X is stored into A. At decision blocks 560, it is determined whether the vector register has been completely stored into Address. If not, then at processing block 580, X is incremented to the next element in the vector register. Then, at processing block 590, A is also incremented to the next element in Address by incrementing from the previous element a length of the vector stride to the next element.

The process then returns to processing block 530 to repeat the process for each element of the vector register to be stored. If, at decision block 560, each element of the vector register has been stored, then the general purpose µop flow for the store instruction is completed at termination block 570.

As can be seen, whenever the general purpose µop flow is used many small load or store operations are applied to each element of the vector. Each element is individually accessed and checked for masking. This means that the general purpose µop flow, in some cases, may be 32+µops. This may take many clock cycles and be inefficient and time-consuming. However, if the memory operations are unmasked, unit-stride memory operations, they may be optimized to obtain performance gains. Such an optimization is shown below with respect to FIGS. 6 and 7.

Figure 6:
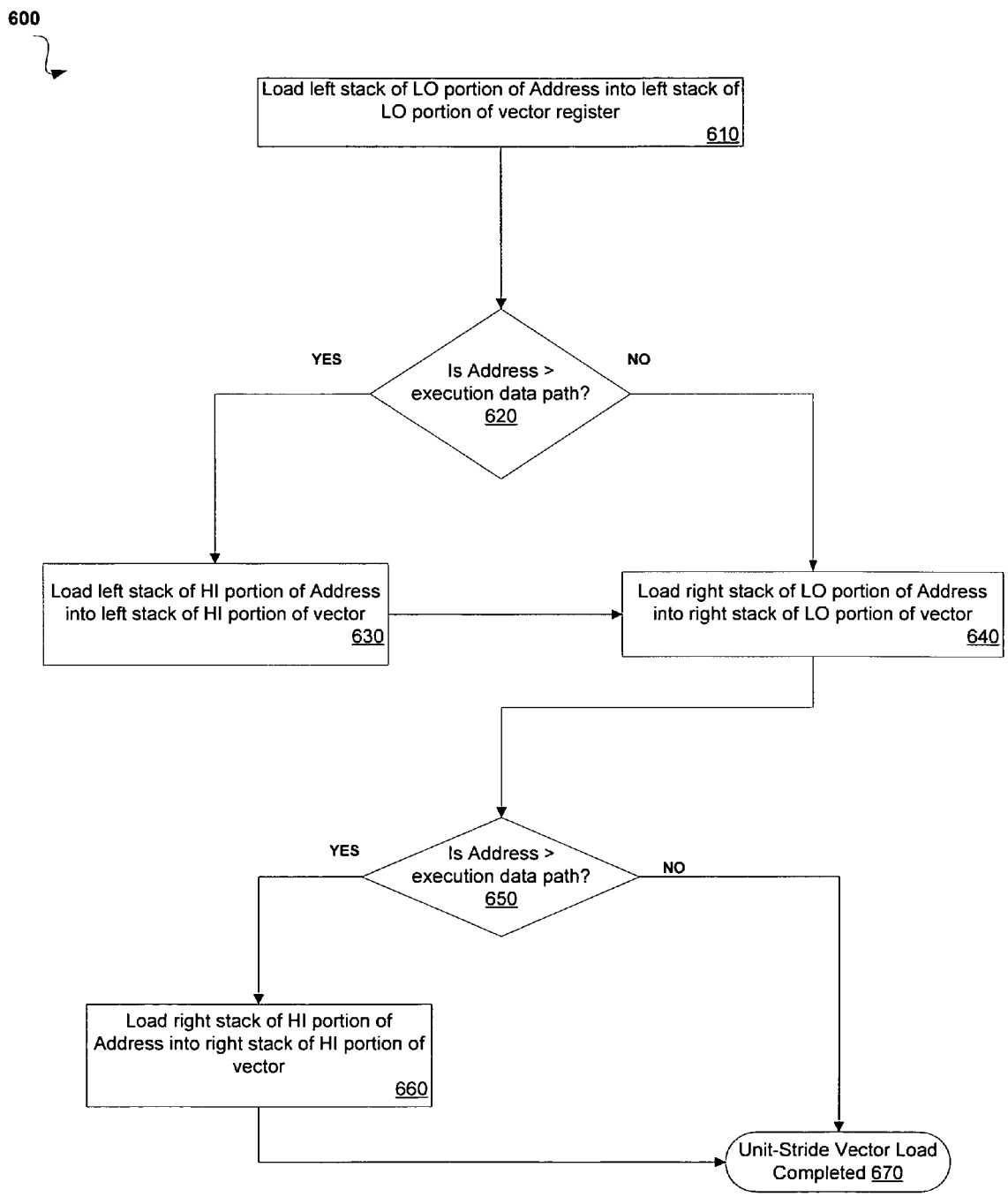
FIG. 6 is a flow diagram of one embodiment of an optimized flow for a memory load operation.

FIG. 6 illustrates one embodiment of a process for an optimized load operation for unmasked and unit-stride memory operations in a processor. In one embodiment, process 600 may be performed by processor 300 described with respect to FIG. 3. At processing block 610, the left stack of the LO portion of Address is loaded into the left stack of the LO portion of the vector register. The left stack refers to the first half of the LO portion of the vector to be loaded.

At decision block 620, it is determined whether the size of Address is greater than the execution data path of the processor. If so, then load instruction should undergo unlamination. At processing block 630, unlamination is implemented by loading the left stack of the HI portion of Address into the left stack of the HI portion of the vector register.

After processing block 630 or if unlamination is not required, the right stack of the LO portion of Address is loaded into the right stack of the LO portion of the vector register at processing block 640. At decision block 650, it is again determined whether Address is greater than the execution data path for unlamination purposes. If unlamination is needed, then at processing block 660, the right stack of the HI portion of Address is loaded into the right stack of the HI portion of the vector register. After processing block 660 or if unlamination is not required, the unit-stride load operation for optimized µop flow is completed at termination block 670.

Figure 7:
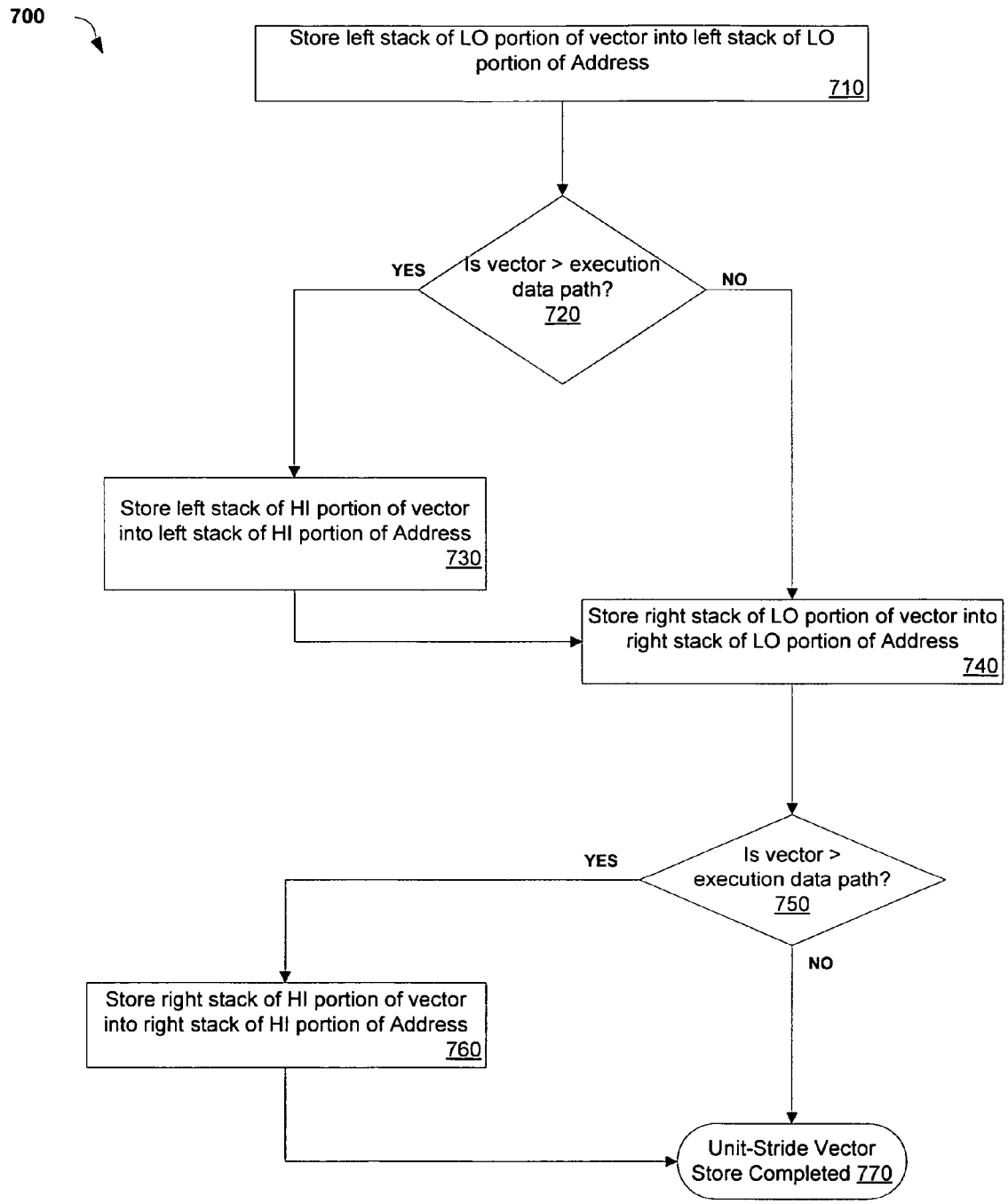
FIG. 7 is a flow diagram of one embodiment of an optimized flow for a memory store operation.

FIG. 7 illustrates one embodiment of a process 700 for an optimized store operation for unmasked, unit-stride memory operations in a processor. In one embodiment, process 700 may be performed by processor 300 described with respect to FIG. 3. FIG. 7 illustrates a similar process to that described with respect to FIG. 6, except for involving a store operation instead of a load operation.

The process 700 begins at processing block 710, the left stack of the LO portion of vector (e.g., a vector register) is stored into the left stack of the LO portion of the Address (e.g., an address). At decision block 720, it is determined whether the size of vector is greater than the execution data path of the processor. If so, then store instruction should undergo unlamination. At processing block 730, unlamination is implemented by storing the left stack of the HI portion of vector into the left stack of the HI portion of the Address.

After processing block 730 or if unlamination is not required, the right stack of the LO portion of vector is stored into the right stack of the LO portion of Address at processing block 740. At decision block 750, it is again determined whether vector is greater than the execution data path for unlamination purposes. If unlamination is needed, then at processing block 760, the right stack of the HI portion of vector is loaded into the right stack of the HI portion of Address. After processing block 760 or if unlamination is not required, the unit-stride store operation for optimized µop flow is completed at termination block 770.

As can be seen, the optimized µop flows of FIGS. 6 and 7 are able to access many elements in a single load or store memory operation. The optimized flows do not have to access each element individually, nor do they have to determine the masking of each individual element. This is in comparison to the general purpose µop flow, which accesses each individual element in many small load and/or store memory operations. The optimized µop flow eliminates the abundance of µop instructions required by the general purpose µop flow, thereby requiring less clock cycles to complete. Therefore, such an optimization may greatly increase the efficiency of a processor.

A typical instruction set architecture (ISA) provides no means to determine statically when the optimized version of the µop flow may be utilized. Indeed, values in the VL, VS, VM, and VCM registers are dynamic values that are changed often. In the following description, a prediction scheme for unmasked, unit-stride µop flow optimization is described.

The prediction scheme includes components for predicting, checking, and updating a predictor, as well as for recovering from faulty predictions.

Figure 8:
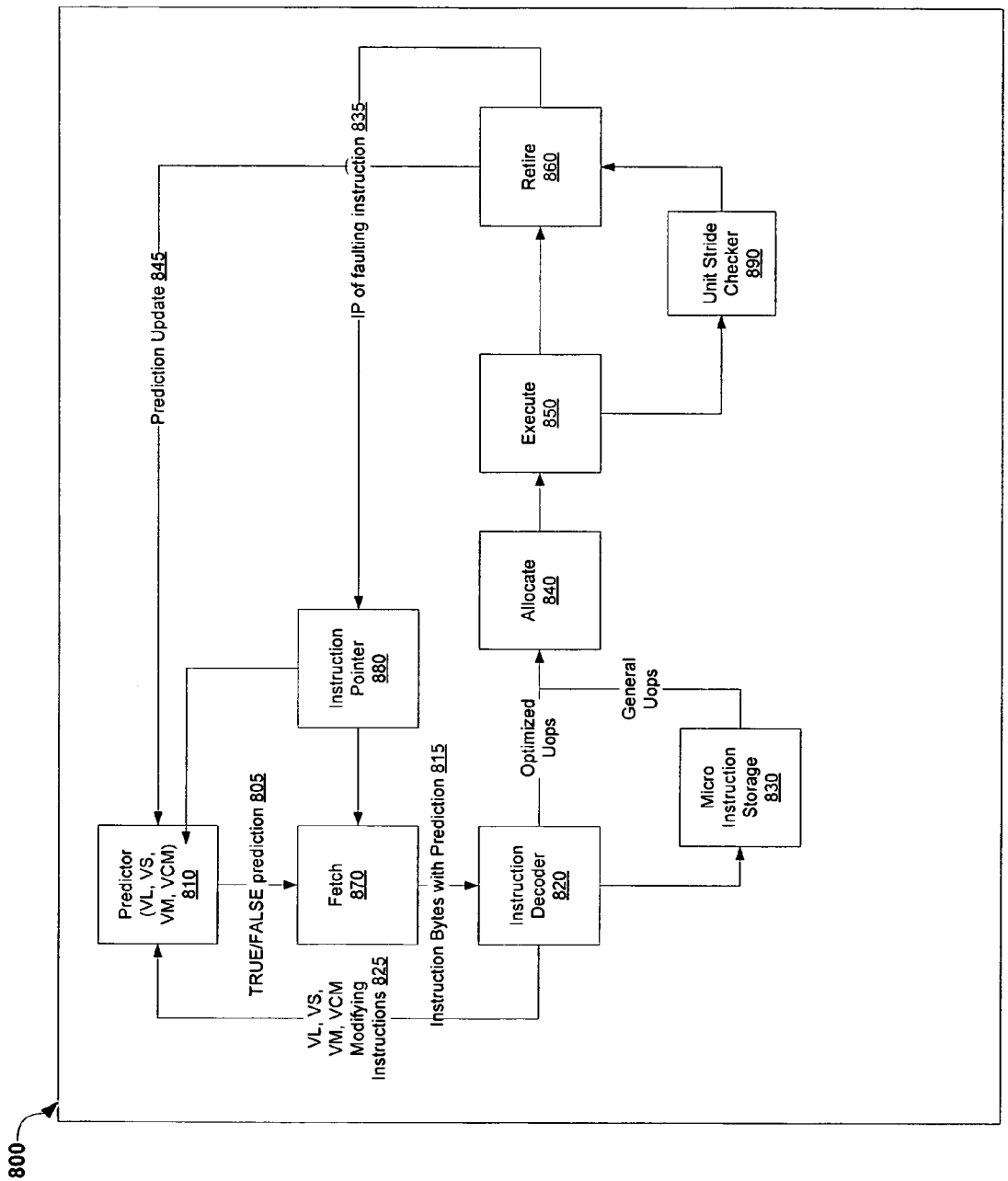
FIG. 8 illustrates a block diagram of another embodiment of a CPU.

FIG. 8 is a block diagram illustrating one embodiment of a processor 800 to implement µop flow optimization and prediction for unmasked, unit-stride vector memory operations. In some embodiments, processor 800 is the same as CPU 300 described with respect to FIG. 3. In addition, the operation of the components of processor 800 is similar to that described above for processor 300 in FIG. 3.

In one embodiment, prediction occurs in the front-end of the processor 800 at predictor 810. An IP 880 for an instruction is fed to predictor 810 and fetch unit 870. Subsequently, instruction bytes annotated with prediction information 815 are fed to instruction decoder 820 from fetch unit 870. The prediction information is based on a true or false prediction 805 made by predictor 810 based on the IP 880. Instruction decoder 820 then decodes the instruction. Decoder 820 also selects between an optimized µop flow and the general purpose µop flow based on the prediction 810 from predictor 810.

In some embodiments, any decoded instructions that modify the VL, VS, VM, and VCM registers 825 are fed back to the predictor 810 in order to facilitate later accurate predictions by the predictor 810. In some embodiments, predictor 810 may use any branch prediction mechanism that may be adapted to predict the unit-stride (e.g., bimodal, global . . . ). Micro-instruction storage 830 and allocator 840 operate in a similar fashion as that described with respect to micro-instruction storage 330 and allocator 340 of FIG. 3.

During execution at execute block 850, the actual values of VL, VS, VM, and VCM are captured. Then, checker 890 verifies that the µops generated by decoder 820 for the instruction are compatible with the actual values. For example, in one embodiment, checker 890 may verify that either VS=0 or VS=element size which indicates unit-stride, and that VM and VCM are all true (or false, based on the polarity) which indicates no masking.

The general purpose µop flow handles any and all values of VL, VS, VM, and VCM. However, the optimized flow is executed when certain values of VL, VS, VM, and VCM are present. As such, the predicted values of VL, VS, VM, and VCM should be verified against the actual values when the optimized µop flow is utilized. This verification is not required when the general purpose µop flow is utilized.

In one embodiment, if the checker 890 stated that the µop flows were compatible for the actual values of VL, VS, VM, and VCM, and then the instruction is allowed to retire at retire block 860. The retire block 860 also sends a 'correct' prediction update 845 to the predictor 810. On the other hand, if the checker 890 states that the µop flow was not compatible with the actual values, then the retire block 860 signals 'incorrect' prediction update 845 to the predictor 810, and also sends the faulting instruction's IP 835 to the instruction pointer 880.

In one embodiment, upon receiving the faulting instruction 835, the processor 800 flushes all instructions that are in flight and restarts at the faulting instruction. On a restart, the instruction is fetched without predictions and, therefore, the general purpose µop flow is used.

The above description provides optimized µop flows for unmasked and unit-stride memory operations, as well as a prediction scheme and architecture to support these optimized µop flows. Optimizing unmasked and unit-stride memory operations results in significant performance gains in the processor.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A method, comprising:
   predicting vector length (VL), vector stride (VS), vector mask (VM), and vector completion mask (VCM) values of an instruction to determine whether to generate an optimized (micro-operation) µop flow;
   generating, by an instruction decoder, the optimized µop flow for the instruction to operate on a vector if the instruction is predicted to be unmasked and unit-stride, wherein the instruction is to access elements in memory; and
   executing the optimized µop flow to access two or more of the elements at the same time without determining masks of the two or more elements.

2. The method of claim 1, wherein the optimized µop flow is unlaminated into multiple identical copies of the optimized µop flow.

3. The method of claim 1, further comprising generating a general purpose µop flow for the instruction if the instruction is at least one of masked and non-unit-stride, wherein the general purpose µop flow to access each of the elements in an individual operation.

4. The method of claim 3, wherein the general purpose µop flow is generated by accessing µop storage with an index provided by the instruction decoder.

5. The method of claim 1, further comprising:
   comparing one or more of the predicted VL, VS, VM, and VCM values against one or more actual VL, VS, VM, and VCM values after the optimized µop flow executes;
   flushing the instruction if the predicted values and the actual values are not the same; and
   wherein after flushing the instruction, executing the instruction again with the general purpose µop flow.

6. The method of claim 5, further comprising retiring the optimized µop flow if the predicted value and the actual values are the same.

7. The method of claim 1, wherein the instruction is unit-stride if the VS value of the instruction is the same as at least one of an element size of the instruction and a value of zero.

8. The method of claim 1, wherein the instruction is unmasked if the VM value of the instruction is a Boolean value of true for all the elements for the instruction.

9. An apparatus, comprising:
   a memory;
   a predictor to predict vector length (VL), vector stride (VS), vector mask (VM), and vector completion mask (VCM) value of an instruction to access elements in the memory;
   an instruction decoder to generate an optimized micro-operation (µop) flow for the instruction if the instruction is predicted as unmasked and unit-stride; and
   an execution unit to access via the optimized µop flow two or more of the elements at the same time without determining masks of the two or more elements.

10. The apparatus of claim 9, wherein the instruction decoder is to unlaminate the optimized µop flow into multiple identical copies of the optimized µop flow.

11. The apparatus of claim 9, wherein the instruction decoder is further to generate a general purpose µop flow for the instruction if the instruction is at least one of masked and non-unit-stride, wherein the general purpose μop flow to access each of the elements in an individual operation.

12. The apparatus of claim 11, wherein the instruction decoder is further to access μop storage with an index to generate the general purpose μop flow from the μop storage.

13. The apparatus of claim 9, wherein the instruction decoder is further to directly generate the optimized μop flow and to forward the optimized μop flow to an allocator, the allocator to schedule the optimized μop flow for execution.

14. The apparatus of claim 9, wherein the instruction is unit-stride if the VS value of the instruction is the same as at least one of an element size of the instruction and a value of zero.

15. The apparatus of claim 9, wherein the instruction is unmasked if the VM value of the instruction is a Boolean value of true for all the elements for the instruction.

16. The apparatus of claim 9, further comprising a retire unit to:
 compare the predicted values against actual values of the VL, VS, VM, and VCM of the instruction after the optimized μop flow is executed; and
 flush the instruction if the predicted values and the actual values do not match;
 wherein after flushing the instruction, the execution unit is to execute the instruction again with the general purpose μop flow.

17. A system, comprising:
 a memory unit;
 a predictor to predict vector length (VL), vector stride (VS), vector mask (VM), and vector completion mask (VCM) value of an instruction to access elements in the memory unit;
 an instruction decoder to generate an optimized micro-operation (μop) flow for the instruction if the predicted values from the predictor indicate that the instruction is unmasked and unit-stride; and
 an execution unit to execute the optimized μop flow to access two or more of the elements at the same time without determining masks of the two or more elements.

18. The system of claim 17, wherein the instruction decoder further to unlaminate the optimized μop flow into multiple optimized μops to operate on a vector.

19. The system of claim 17, wherein the instruction decoder is further to generate a general purpose μop flow for the instruction if the predicted values indicate that the instruction is at least one of masked or non-unit-stride, the general purpose μop flow to individually access each of the elements and determine the mask of each element.

20. The system of claim 19, wherein to generate the general purpose μop flow includes the instruction decoder accessing μop storage with an index provided by the instruction decoder.

21. The system of claim 17, further comprising a retire unit to:
 verify the predicted values against actual values of the VL, VS, VM, and VCM of the instruction after the optimized μop flow is executed; and
 flush the instruction if the predicted values and the actual values are not the same;
 wherein after flushing the instruction, the execution unit is to execute the instruction again with the general purpose μop flow.

22. The system of claim 21, wherein the retire unit is further to retire the optimized μop flow if the predicted value and the actual values are the same.

23. The system of claim 17, wherein:
 the instruction is unit-stride if the VS value of the instruction is the same as at least one of an element size of the instruction and a value of zero; and
 the instruction is unmasked if the VM value of the instruction is a Boolean value of true for all the elements for the instruction.

* * * * *